US005100058A

United States Patent [19]

Wei

[11] Patent Number: 5,100,058
[45] Date of Patent: Mar. 31, 1992

[54] SELF-CONTAINED CLEANING SYSTEM FOR MOTOR VEHICLES

[76] Inventor: Toby Wei, No. 78, Tu-Hsing Road, Taichung, Taiwan, Taiwan

[21] Appl. No.: 679,607

[22] Filed: Apr. 3, 1991

[51] Int. Cl.[5] .......................... B05B 15/06; B05B 9/04
[52] U.S. Cl. ............................ 239/273; 239/332; 239/526; 239/DIG. 11; 222/173; 222/333; 222/377
[58] Field of Search ............... 239/273, 332, 360, 394, 239/526, DIG. 11; 222/173, 333, 377

[56] References Cited

U.S. PATENT DOCUMENTS

| 2,939,671 | 6/1960 | Beekman | 239/273 X |
|---|---|---|---|
| 3,006,560 | 10/1961 | Rosenkranz | 239/526 X |
| 3,596,835 | 8/1971 | Smith et al. | 239/394 |
| 4,534,512 | 8/1985 | Chow et al. | 239/394 |
| 4,621,770 | 11/1986 | Sayen | 239/332 X |
| 4,801,088 | 1/1989 | Baker | 239/332 X |
| 4,850,536 | 7/1989 | Teranishi et al. | 239/332 |

*Primary Examiner*—Andres Kashnikow
*Assistant Examiner*—William Grant

[57] ABSTRACT

A self-contained cleaning system particularly suited for use with motor vehicles comprising a storage tank filled with cleaning fluid and containing a pump and a D.C. electric motor, a hose, and an external power cord, and a pistol shaped sprayer head. Depressing a trigger shaped control piece on the sprayer head opens a valve disposed therein and closes an electrical switch that activates the D.C. electric motor which drives the pump, sending cleaning fluid through the hose to the sprayer head. Cleaning fluid is emitted from one of several nozzles on a rotatable nozzle selector on the front of the sprayer head. A locking mechanism, which can hold the control piece in one of several pre-determined positions, along with a magnet in the base of the handle of the sprayer head enables hands free operation of the unit, with the sprayer head secured by the handle to a steel surface such as a car body. The 12 volt D.C. power required by the motor can come directly from a car's electrical system, connected with the external power cord, or dry cells stored in an internal compartment in the storage tank can be used.

6 Claims, 5 Drawing Sheets

SELF-CONTAINED CLEANING SYSTEM FOR MOTOR VEHICLES

BACKGROUND OF THE PRESENT INVENTION

The present invention relates to self-contained cleaning system and more particularly to a self-contained cleaning system especially suited to motor vehicles that enables hand free operation.

The self-contained cleaning system of the present invention addresses the needs of a user who desires a cleaning system with its own supply of cleaning fluid when running water may not be available and that can deliver the water or cleaning fluid in a forceful spray without the need for an external power supply, which might also not be at hand.

The self-contained cleaning system of the present invention meets these needs by providing a system with its own storage tank for cleaning fluids and a battery operated motor and pump which can deliver a forceful spray through a pistol shaped sprayer head.

Moreover, the sprayer head can be locked to emit a spray of cleaning fluid without the need of further hand pressure and an internal magnet enables the sprayer head to be secured to a steel surface, such as a car body, so that hands free operation is possible.

An external power cord is also provided so that an auxiliary power source can also be used. These advantages and full details of the invention are discussed below.

SUMMARY OF THE PRESENT INVENTION

The self-contained cleaning system of the present invention has as a first objective to provide a cleaning system that stores its own cleaning fluid and does not require an external power supply, and a second objective of providing a cleaning system that enables hands free operation.

The self-contained cleaning system of the present invention comprises a storage tank containing cleaning fluid, a pump with a driving motor enclosed within, an external power cord, a hose, and a pistol shaped sprayer head.

The sprayer head has a trigger shaped control piece that when depressed opens an internal valve and closes electrical switch which activates the pump motor. The pump then sends cleaning fluid through the hose to the spray head where it is emitted through any one of several nozzles on a rotating nozzle selector.

The nozzles on the nozzle selector offer a wide range of sprays to cater to various cleaning situations. The power required to operate the pump motor can come either from internal batteries or from a car's electrical system, connected to the storage tank with the external power cord.

The first objective of the present invention is thereby achieved.

The flow from the sprayer head can be continuously adjusted from an off state to a state of maximum flow by varying the position of the control piece.

Moreover, by flipping up a setting tab on the side of the sprayer head, any one of several pre-determined settings can be chosen, where the sprayer head emits a constant flow corresponding to the setting without further finger pressure on the control piece.

This feature along with a magnet disposed on the bottom of the pistol grip shaped handle of the sprayer head enables the sprayer head to be secured to a suitable steel surface and spray cleaning fluid without further handling by a user.

Especially in the case of a motor vehicle, the self-contained cleaning system of the present invention affords a great convenience and usage. Attached to a steel body fender, the sprayer head can spray cleaning fluid onto a portion of the vehicles body while a user would have both hands free for the washing operation.

On recreational trips, such as camping or sightseeing, where a supply of water may not be in vicinity, the self-contained cleaning system would offer great relief, with the added advantage of being able to draw power from the car's electrical system and the ability to use the car's body as a mount.

PREFERRED EMBODIMENT OF THE PRESENT INVENTION

Figure 1:
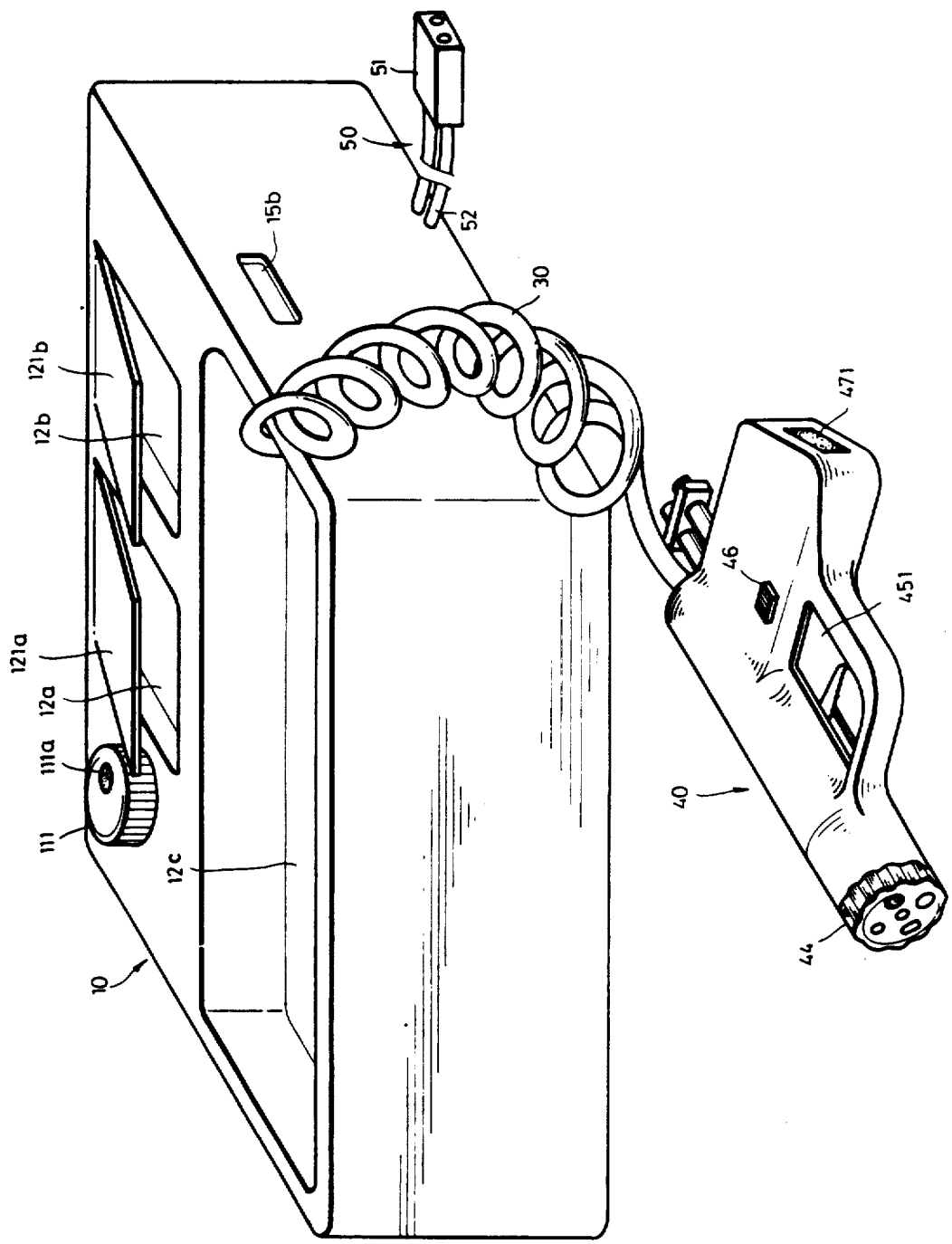
FIG. 1 is a perspective view of the self-contained cleaning system of the present invention.

Referring to FIG. 1, the self-contained washing system for motor vehicles comprises a storage tank 10, containing cleaning fluid, an external power cord 50, a hose 30, and a pistol shaped sprayer head 40.

Figure 2:
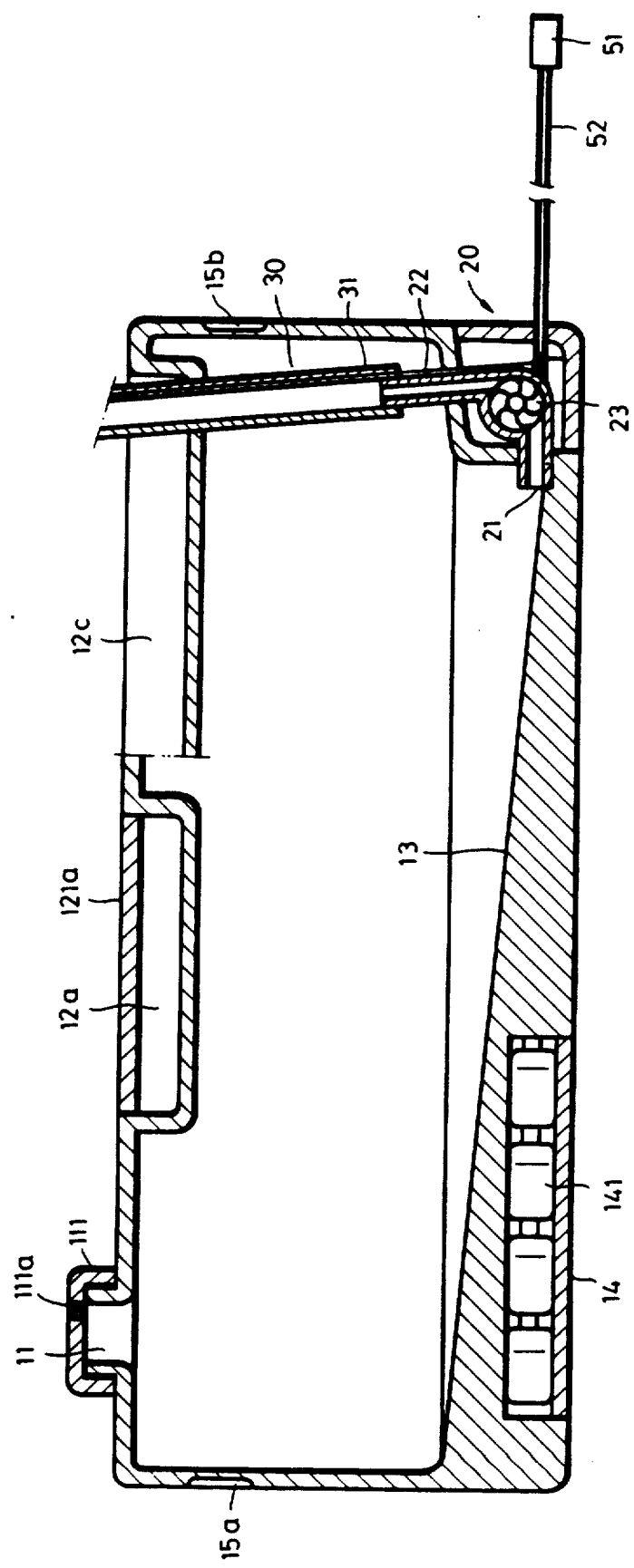
FIG. 2 is a cut away view of the self-contained cleaning system of the present invention.

The top of storage tank 10 has a circular mouth 11, shown in FIG. 2, through which cleaning fluid is poured. Mouth 11 is normally closed by a cap 111, with a porous plug 111a. Plug 111a allows air to pass freely into storage tank 10 while cleaning fluid is drained therefrom.

Trays 12a, 12b, and 12c provide storage for cleaning accessaries or other paraphernalia. In particular, storage tray 12c can be used for storing sprayer head 40 and hose 30. Trays 12a and 12b also have closeable lids 121a and 121b, respectively.

Referring to FIG. 2, a handle recess 15a and 15b are formed on the respective sides of storage tank 10. The bottom 13 of storage tank 10 slopes downwards towards a corner thereof, where a pump 20 is disposed. The incline of bottom 13 insures that cleaning fluid flows towards the inlet pipe 21 of pump 20. The impeller 23 of pump 20 forces cleaning fluid from inlet pipe 21 out through outlet pipe 22 under pressure. Impeller 23 is driven by a D.C. electric motor (not shown).

The D.C. electric motor can be powered by electricity from power cord 50 which has electrical wires 52 and a jack 51, for connecting to the 12 volt battery system of a motor vehicle. Alternately, it can be powered by dry cells 141 stored in a battery compartment 14 disposed in the bottom of storage tank 10.

An end 31 of hose 30 is attached over the end of outlet pipe 22, which extends through the bottom of tray 12c near a corner of storage tank 10. Referring again to FIG. 1, the other end 32 of hose 30 is attached to sprayer head 40 so that pressurized cleaning fluid flows thereto.

Externally, pistol shaped sprayer head 40 comprises a pistol grip 47, a trigger shaped control piece 451, a setting tab 46, and a fluted nozzle selector 44, with a plurality of nozzles 441 formed thereon.

Figure 3:
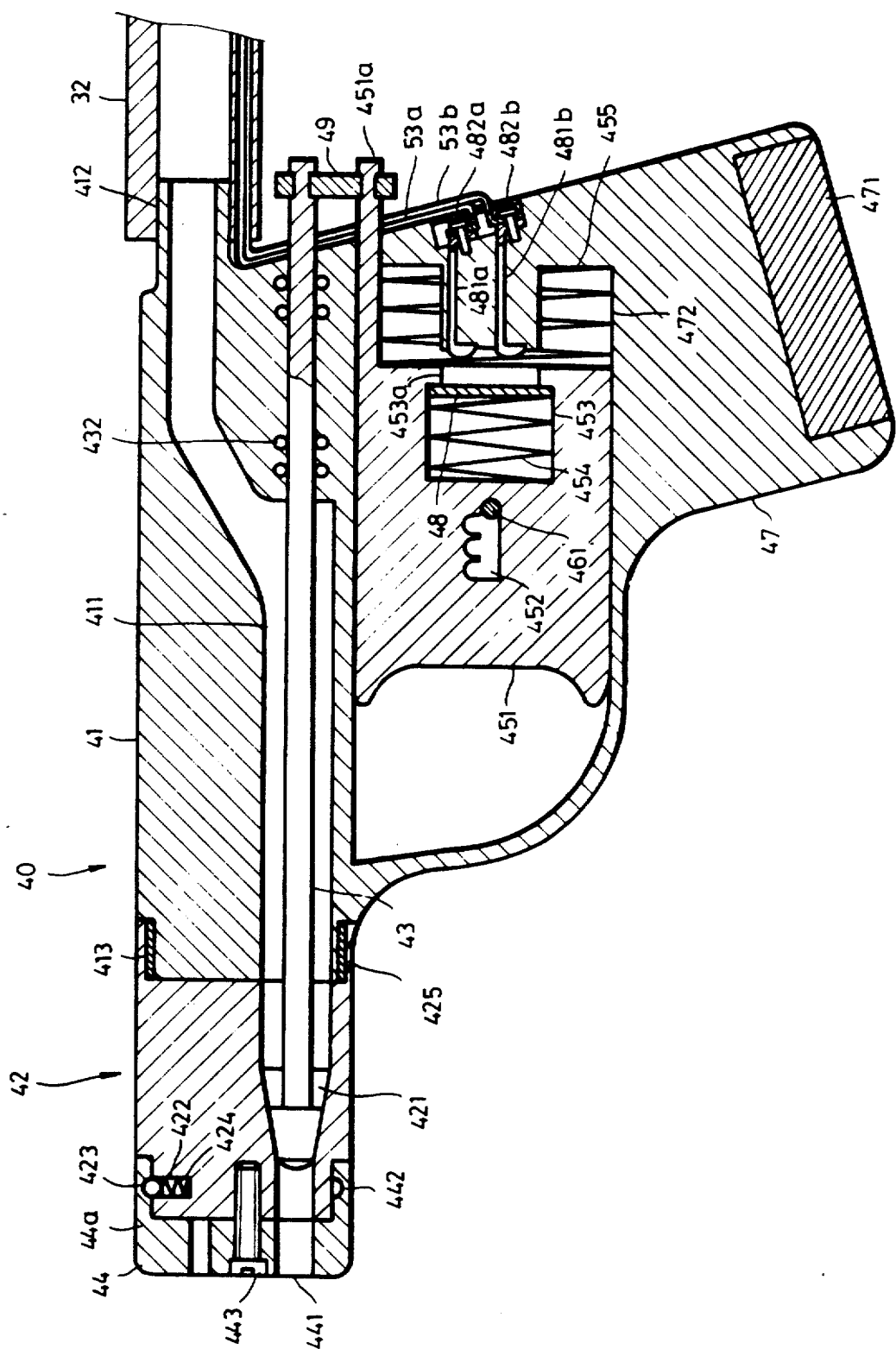
FIG. 3 is a sectional view of the sprayer head of the self-contained cleaning system of the present invention with the valve of the sprayer head in a closed state.
Figure 4:
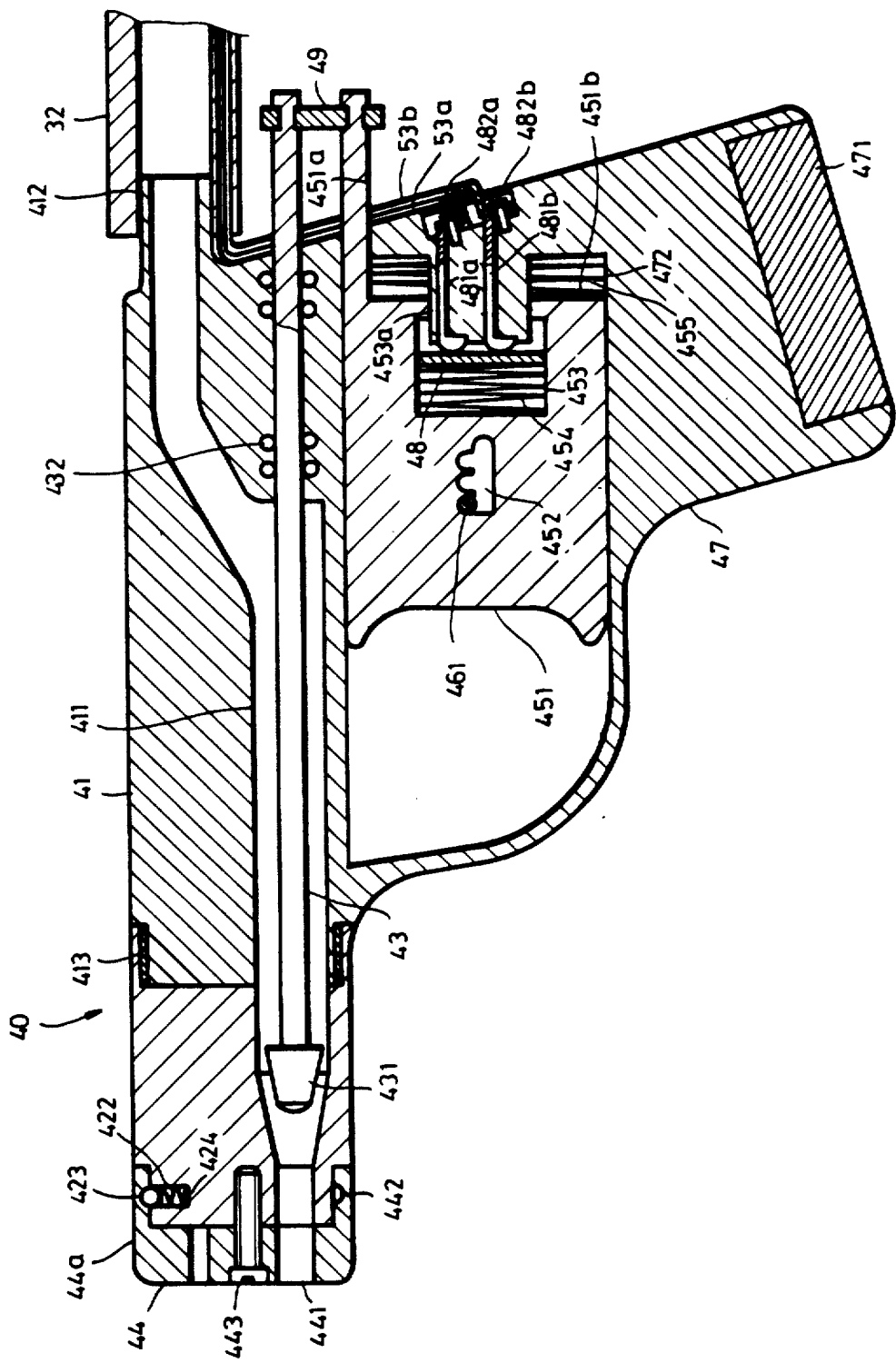
FIG. 4 is a sectional view of the sprayer head of the self-contained cleaning system of the present invention with the valve of the sprayer head in a open state, and the control piece locked in position.

For a detailed view of the interior of sprayer head 40, refer to FIGS. 3 and 4.

At the top of sprayer head 40 is a conduit section 41 with an internal conduit 411 for carrying cleaning fluid, which extends outwards to the rear to from inlet 412. End 32 of hose 30 is attached over inlet 412 and wires 53a and 53b are embedded in the wall of hose 30. This obviates the need for an external cable that can easily become tangled or damage.

To the front of conduit section 41 is a valve section 42 with an internal venturi 421. A coupling rim 425 formed at the rear of valve section 42 is secured by friction fit over a cylindrical gasket 413 disposed over the front of conduit section 41. The diameter of internal venturi 412 is equal with that of conduit 411 at the rear and tapers to a smaller diameter to meet with a nozzle 441 of nozzle selector 44 at the front thereof. Normally venturi 421 is closed off by a rubber valve gate 431, shaped like the frustum of a cone, that abuts against the sloping sides thereon.

Valve gate 431 is attached to a valve rod 43 that passes through conduit section 41 and protrudes to the rear thereof. A plurality of O-ring seals 432 prevent leakage of cleaning fluid.

Nozzle selector 44 is rotatably secured to the front of valve section 42 by a retaining screw 443. A plurality of nozzles 441 are formed on the front of nozzle selector 44. To the rear thereof are formed a corresponding plurality of hemi-spherical detent receses 442, on the inner periphery of a coupling rim 44a. Each nozzle 441 can be selectively aligned with venturi 421 by rotating nozzle selector 44 until its corresponding detent recess 442 engages a steel ball 423.

Steel ball 423 is housed in a ball cavity 422, formed on the top of valve section 42 under coupling rim 44a, and backed by a spring 424.

A trigger shaped control piece 451 is disposed between conduit section 41 and pistol grip 47, and is capable of sliding back and forth. Control piece 451 has a locking cavity 452, a contact cavity 453, a rear wall 451b, and a rod 451a, which protrudes from the rear of pistol grip 47. A connecting block 49, attached to the real of rod 451a and valve rod 43, couples control piece 451 to valve rod 43 and valve gate 431, attached thereon.

Control piece 451 is normally in a forward position with valve gate 431 closing off venturi 421, as is the situation in FIG. 3. A return spring 455 disposed within spring cavity 472 pushes against the rear wall 451b of control piece 451, giving it a tendency to move forward.

A contact plate 48 is disposed within contact cavity 453, with a spring 454 causing it to assume a rearward position, stopping against a retaining rim 453a thereon.

To the rear of contact plate 48 are terminals 481a and 481b, disposed on a terminal block 473 within pistol grip 47. Terminals 481a and 481b have an electrically conducting path with respective wires 53a and 53b, being secured thereon by respective screws 482a and 482b.

Current that powers the D.C. electric motor which drives pump 20 must first pass through wires 53a and 53b as well as terminals 481a and 481b. Contact plate 48 closes the required electrical path by making contact with terminals 481a and 481b when pushed back by control piece 451, as described more fully below.

In operation, a user grasps sprayer head 40 by pistol grip 47 and squeezes back on trigger shaped control piece 451 with his fingers.

Control piece 451 moves back a short distance before contact plate 48, abutting against retaining rim 453a, makes contact with terminals 481a and 481b. Electrical current then flows through wires 53a and 53b to activate the D.C. motor of pump 20, which sends cleaning fluid through hose 30. Rearward motion of control piece 451 also compresses spring 455 in spring cavity 472.

Concurrently, valve gate 431 which, as mentioned, is coupled to control piece 451 through valve rod 43 and connecting block 49, moves backwards by an equal distance. This creates a sufficient gap between valve gate 431 and venturi 421 to allow air in hose 30 and conduit 411 to evacuate before the onrushing cleaning fluid, reducing the load on pump 20 and insuring a stable flow upon start up.

Referring to FIG. 4, as control piece 451 moves further to the rear, terminal block 473 enters contact cavity 453, causing contact plate 48 to move inwards within cavity 453 and compressing spring 454 therein. Spring 455 is compressed further within spring cavity 472 and valve gage 431 is retracted further in venturi 421. This causes the volume of flow of cleaning fluid from sprayer head 40 to increase.

In addition to controlling the volume of spray by adjusting the position of control piece 451, sprays of varying shape and dispersion can be chosen by selecting a particular spray nozzle 441 from among several on nozzle selector 44 as was described above.

Control piece 451 can also be fixed in place at any of three pre-determined positions with the aid of external setting tab 46. A round setting catch 461 attached to setting tab 46 extends into locking cavity 452 and is normally in a lower, rearwards position, as shown in FIG. 3.

Three semi-circular locking recesses 452a are formed on the top of locking cavity 452. With control piece 451 moved rearwards so as to align one of the locking recesses 452a over setting catch 461, setting tab 46 is pushed upwards to engage setting catch 461 with the aligned locking recess 452a. This locks control piece 451 in place, allowing a selected volume of spray to issue forth from sprayer head 40 without further pressure from the user's hands. FIG. 4 shows the situation for a maximum flow setting.

Figure 5:
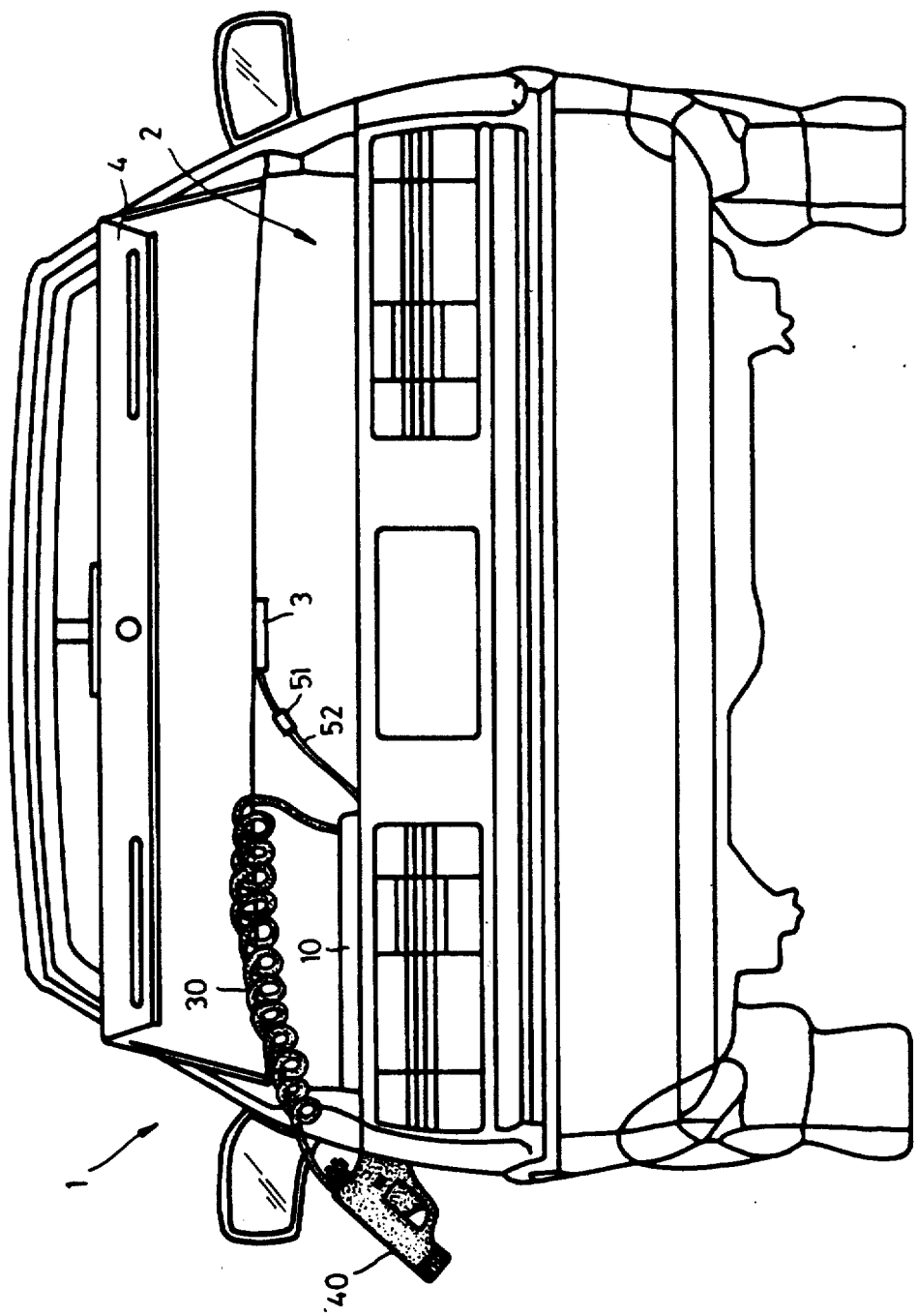
FIG. 5 is a view of the self-contained cleaning system of the present invention placed in a rear trunk of an automobile with the sprayer head attached to a side body fender thereon.

This feature is particularly useful in conjunction with magnet 471 disposed at the base of pistol grip 47. Referring to FIG. 5, sprayer head 40 is releasably secured to the steel side of an automobile 1, pistol grip 47 adhering thereon due to the strong attraction of magnet 471. Storage tank 10 is ensconced in the left, front side of a rear trunk 2 with jack 51, on the end of power cord 50, engaged with a socket in an auxiliary power outlet 3 at the rear, center of trunk 2. Hose 30 extends outwards to sprayer head 40 from under an open rear hood 4.

A user can thus enjoy hands free operation by depressing control piece 451 on sprayer head 40 and locking it in place with setting tab 46 as described above.

I claim:

1. A self contained washing system comprising a storage tank containing cleaning fluid, a pump driven by a direct current electric motor, both disposed within said storage tank, an external power cord, a hose, and a pistol shaped sprayer head, wherein:

a compartment for optional batteries is provided within said storage tank;

said pistol shaped sprayer head has an elongate upper portion, a pistol grip handle disposed below and to the rear of said upper portion, a trigger control piece disposed below said upper portion and to the upper, front section of said handle, and a nozzle selector with a plurality of differently shaped nozzles, rotatably secured to the front of said upper portion;

a valve with a valve inlet, a valve outlet, and a valve gate is disposed within said sprayer head, said valve being continuously adjustable from an off state to a state of maximum flow, said valve gate is connected to and controlled by said control piece;

said pump has a pump inlet and a pump outlet, said pump inlet communicating with the interior of said storage tank containing said cleaning fluid, said pump outlet being attached to a first end of said hose;

an external inlet disposed on the exterior of said sprayer head communicates with said valve inlet and a second end of said hose is attached thereon, allowing said cleaning fluid to flow from said pump to said valve;

an on/off electrical switch is disposed within said sprayer head and is turned on by rearward motion of said control piece;

a first electrical wire and a second electrical wire, extending from said storage tank, are connected to a respective first terminal and second terminal of said electrical switch;

a locking means enables said control piece to be releasably fixed at more than one pre-determined positions;

said nozzle selector can be rotated to selectively align a said nozzle with said valve outlet and releasably fixed in place by a detent means;

a magnet is disposed at the lower base of said handle;

said external power cord can be connected with the electrical system of a motor vehicle to draw current therefrom, to power said motor, in place of said batteries in said battery compartment;

whereby, depressing said control piece to the rear opens said valve and turns on said switch, starting said motor driving said pump and sending said cleaning fluid to said sprayer head, to emit from a said nozzle thereon;

with said sprayer head releasably secured to a magnetically attracting surface by the action of said magnet in said handle, said control piece can be releasably fixed in position with said locking means to enable hands free operation of said self contained washing system, with a selected rate of flow issuing forth from said sprayer head.

2. A self contained cleaning system according to claim 1, wherein:

said valve gate comprises a substantially cone-shaped element made from a pliant material secured to a valve rod connected to said control piece; 'said valve inlet is joined to said valve outlet by a tapering venturi with said valve inlet being of larger diameter than said valve outlet;

whereby, said conical element abuts against the sloping wall of said venturi when said valve is in an off state, transferring no fluid, and is drawn to the rear by the action of said control piece on said valve rod when passing fluid.

3. A self contained cleaning system according to claim 2, wherein: .

said contact piece is confined to movement along a single direction within a return cavity that extends to the rear of the upper section of said handle, with a first spring disposed within said return cavity that pushes said control piece forwards to a rest position when said control piece is not depressed rearwards by a user's hand, said forward position of said control piece corresponds with the off state of said valve, when said cone-shaped element abuts against said venturi;

said electrical switch comprises a contact plate disposed within a reentrant cavity in said control piece, with a second spring pushing said contact plate against a rim formed on the rear of said reentrant cavity, said terminals of said switch being fixed in place behind said contact plate, separated by a short distance, when said control piece is at said rest position;

whereby, when said control piece is depressed by a user's hand, said control piece first moves rearward by said short distance so that said contact plate meets said terminals to turn on said electrical switch to cause said pump to deliver cleaning fluid to said sprayer head through said hose, said valve gate will have also been retracted by an equal said short distance, sufficient to allow air within said hose and said sprayer head to be evacuated before the onrush of said cleaning fluid, insuring a stable flow and preventing excessive loading upon said pump upon start up.

4. A self contained cleaning system according to claim 1, wherein:

said locking means comprises a locking cavity formed in said control piece with more than one locking recess formed on its upper surface with a catch extending into said locking cavity, said catch being connected to an external setting tab confined to movement along an up, down direction;

whereby, with said catch and said setting tab in a lowered position, said control piece can be depressed rearwards by a user's hand so that one selected said locking recess is aligned over said catch and said control piece releasably locked in place by moving up said setting tab, engageing said catch with selected said locking recess.

5. A self contained cleaning system according to claim 1, wherein said detent means comprises:

a set of hemispherical recesses formed on a rear surface of said nozzle selector, with each said hemispherical recess corresponding with one said nozzle, said hemispherical recesses being juxtaposed against a forward surface of said upper portion;

a sphere, made from a rigid material, and of the same diameter as said hemipherical recesses is disposed within a ball cavity formed on said forward surface of said upper portion and pushed in an outwards direction by a spring;

whereby, when said nozzle selector is rotated so as to align a selected said nozzle with said valve outlet, the corresponding said hemispherical recess of selected said nozzle engages said sphere to releasably secure the orientation of said nozzle selector.

6. A self contained cleaning system according to claim 1, wherein said electrical wires extending between said storage tank and said sprayer head are embedded within the wall of said hose, thereby obviating the need for external wiring.

* * * * *